United States
Collier

[11] 3,935,448

[5] Jan. 27, 1976

[54] OPTICAL SCANNING SYSTEMS

[75] Inventor: David Thomas Collier, Dunstable, England

[73] Assignee: Hawker Siddeley Dynamics Limited, England

[22] Filed: Aug. 6, 1974

[21] Appl. No.: 495,209

[30] Foreign Application Priority Data
Aug. 6, 1973   United Kingdom............... 37191/73

[52] U.S. Cl. ...................... 250/236; 250/238; 350/7
[51] Int. Cl.² ............................................ H01J 3/14
[58] Field of Search .............. 350/6, 7, 77; 250/236, 250/203 R, 238; 178/DIG. 14

[56]        References Cited
          UNITED STATES PATENTS
2,901,942   9/1959   Tackaberry...................... 350/77 X
3,614,194   10/1971  Harris .................................. 350/7
3,742,238   6/1973   Hoffman................................ 350/6
3,829,192   8/1974   Wheeler................................. 350/7

*Primary Examiner*—Walter Stolwein
*Attorney, Agent, or Firm*—Rose & Edell

[57]  ABSTRACT

An optical scanning system has a dirigible head of generally spherical shape mounted on a support body for scanning through a substantially hemispherical field of view, and optical lenses, a scanner rotor and drive motor therefor, and a cryogenically-cooled detector element array are all mounted within the confines of the dirigible head. The head has a primary objective lens in its outer shell and further lenses are mounted within the head in an adjustable holder enabling different lenses to be brought into alignment with the objective lens. The scanner rotor is generally annular and rotates about an axis oblique to the optical axis of the objective lens; it comprises a multi-faceted reflector receiving the image beam from the lens system and reflecting it laterally on to the detector array.

5 Claims, 3 Drawing Figures

OPTICAL SCANNING SYSTEMS

This invention relates to optical scanning systems. In co-pending patent application Ser. No. 495,208 of James Arthur Crowhurst filed Aug. 6th 1974 and assigned to the same assignee as the present invention there is disclosed apparatus for directing and controlling a dirigible scanning head with reference to a support member on which such head is mounted, said scanning head carrying the optical and associated elements of a system for scanning a field of view.

The present invention is concerned with the realization of such apparatus in which the elements of a further scanning system for recording or display of the optical information are mounted within the geometrical confines of the optical scanning head.

According to the present invention, there is provided an optical scanning system, comprising a dirigible head of generally spherical form having an objective lens set in its outer shell, an optical assembly mounted within the confines of said head and having one or more further lenses in axial alignment with said objective lens, and a substantially annular scanner rotor also mounted within the confines of said head to rotate about an axis which is oblique to the optical axis of said lenses said rotor including a multi-faceted reflector to receive an image beam from said further lenses and reflect it laterally on to means for processing the optical information it contains to provide a record or display.

In preferred form, said further lenses are mounted on a holder within the dirigible head which holder is angularly adjustable to bring different alternative lenses or lens combinations into alignment with the objective lens.

In order to give a better understanding of the invention one arrangement in accordance therewith will now be described with reference to the accompanying drawings, in which.

Figure 1:
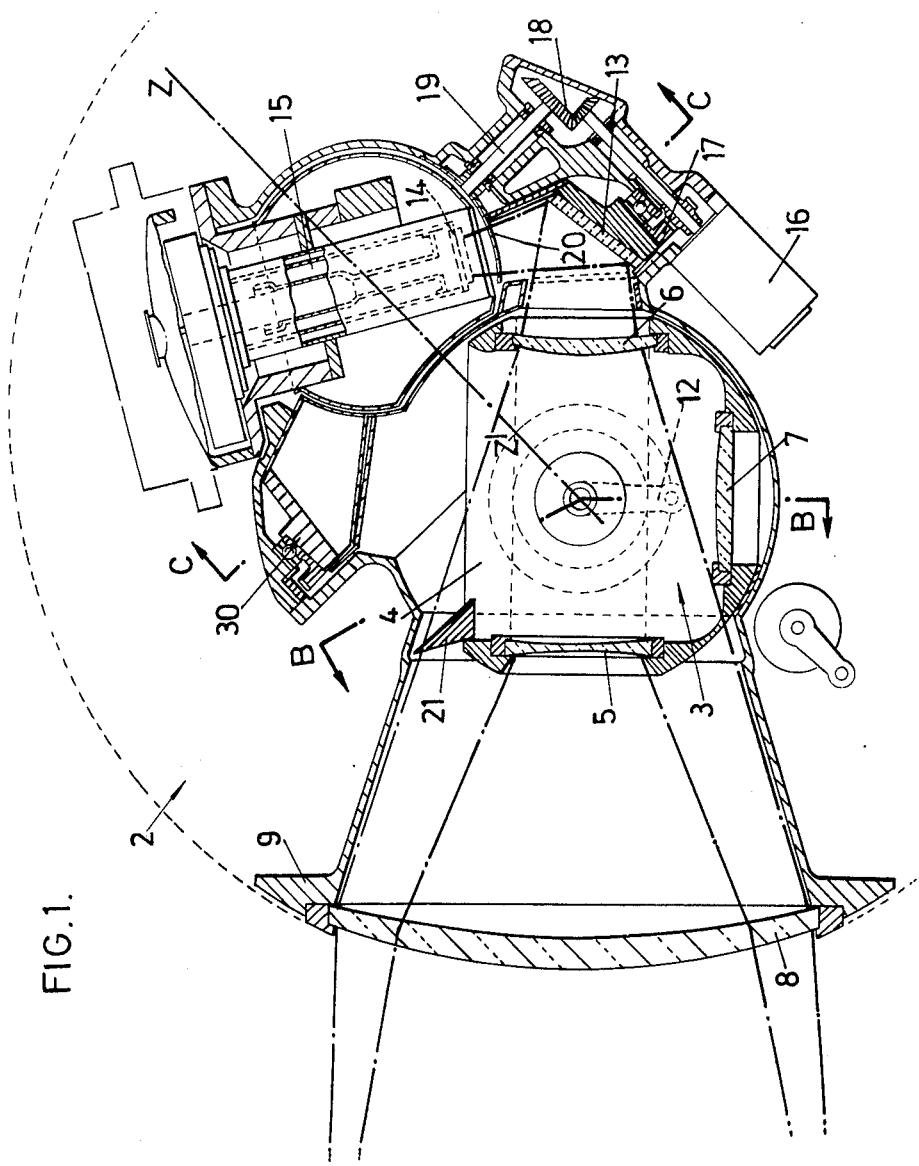
FIG. 1 shows in sectional elevation, the general layout of a line-scan system.

Referring to FIG. 1, there is shown an optical head 2 of generally spherical form which may be mounted on a support member (not shown) for displacement over a hemispherical field of view in the manner described in co-pending patent application Ser. No: 495,208 supra.

Mounted for partial rotation about the geometrical centre of the scanning head 2 is lens assembly 3, comprising a lens holder 4 in which are contained lenses 5, 6 and 7, lenses 5 and 6 being mounted with their axes coincident in the horizontal plane, while lens 7 is mounted with its axis vertical. As shown, lenses 5 and 6 are in alignment with a lens 8 which is a primary objective lens fixed in the substantially spherical outer casing or shell 9 of the scanning head 2.

Figure 2:
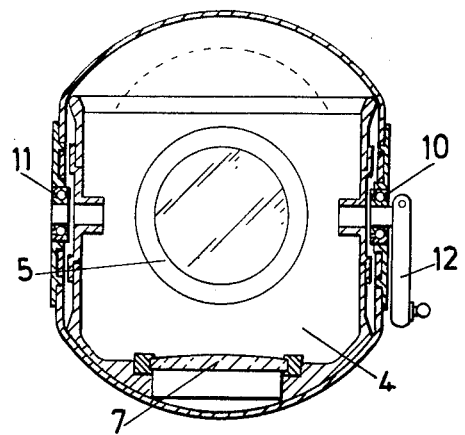
FIG. 2 is a view in section on the line B—B of FIG. 1.
Figure 3:
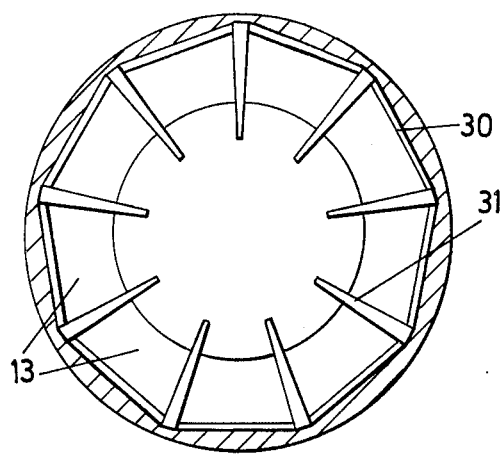
FIG. 3 is a view of the scanner rotor on the line C — C of FIG. 1.

Referring to FIG. 2, this shown a section through bearings 10 and 11 on which lens holder 4 is rotatably mounted. On actuation of a lever 12 the holder 4 can be rotated through 90° to select the combination of lenses 8, 5 and 6 or 8 and 7 as required to give the desired magnification of an image directed behind the lens holder 4 on to a mirror 13. A shade 21 is provided which is designed to prevent excess light entering the primary objective lens 8 from bypassing the lens holder 4. Mirror 13 is of the multifaceted type (as shown in FIG. 3) and is built into a substantially annular acanning rotor 30 with screening vanes 31 between the facets. The scanning rotor is mounted for rotation about an axis ZZ' oblique to the optical axis of the lens 8 and serves to reflect an image laterally on to a multi-element photo-electric, e.g. infra red, detector array shown generally at 14, this detector array being cooled by cryogenic means shown generally at 15.

Rotation of the scanning rotor 30 is by means of a drive motor 16 mounted with its axis parallel to the axis of rotation of the rotor and having a shaft pinion engaging a peripheral gear 17 on the rotor. Driven from motor 16 by further gearing 18 is a shaft 19 at the end of which is carried a shutter blade 20, the arrangement being such that blade 20 blands off the beam reflected from the scanner mirror 13 to the detector array 14 at predetermined intervals so giving a blank reference to the detector array.

In this arrangement, the speed of rotation of the mirror 13, the number of detectors in the detector array and their arrangement, and the shutter speed is such that the signals produced by the detector array are readily processable for a 625 line television display.

While the foregoing description has been confined to a particular mounting and arrangement of the optics and detector array of a line scanning display system, the invention is not so limited and alternative means of processing the optical information may be mounted and contained within the geometrical circumference of the optical scanning head. For example, a camera for tracking and filming a scene may be provided. An electrical power source for the scanning head may also be provided within its geometrical confines, or alternatively the power drive to move the scanning head may be externally supplied as in co-pending application Ser. No. 495,208 supra.

What I claim is:

1. An optical scanning system comprising a head of generally spherical form having an objective lens set in its outer shell, an optical assembly mounted within the confines of said head and having at least one further lens in axial alignment with said objective lens, and a substantially annular scanner rotor and drive motor therefore also mounted within the confines of said head said rotor rotating about an axis which is oblique to the optical axis of said lenses and including a multi-faceted reflector the facets of which face inward toward said oblique axis to receive an image beam from said lenses and reflect it laterally on to means for processing the optical information it contains to provide a record or display.

2. A system according to claim 1, wherein said further lens is mounted on a holder within the head which holder is angularly adjustable to bring different alternative lens means into alignment with the objective lens.

3. A system according to claim 1 wherein the means for processing the optical information comprises an array of photoelectric detector elements also mounted within the confines of the head at a position to receive the image beam reflected by the scanner reflector.

4. A system according to claim 3 wherein the drive motor for the scanner rotor is mounted with its axis parallel to the oblique axis of rotation of the scanner rotor and drives the rotor by means of a peripheral ring gear on the rotor.

5. A system according to claim 4, wherein the drive motor also drives a shutter blade that periodically blanks off the image beam falling on the detector array.

* * * * *